US008065112B2

(12) United States Patent
Berwanger (10) Patent No.: US 8,065,112 B2
(45) Date of Patent: Nov. 22, 2011

(54) APPARATUS AND METHOD FOR ASSESSING EXCEEDANCE OF A PROCESS BEYOND SAFE OPERATING LIMITS

(75) Inventor: Patrick C. Berwanger, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 178 days.

(21) Appl. No.: 12/497,895

(22) Filed: Jul. 6, 2009

(65) Prior Publication Data

US 2009/0281769 A1  Nov. 12, 2009

Related U.S. Application Data

(62) Division of application No. 10/895,212, filed on Jul. 20, 2004, now abandoned.

(51) Int. Cl.
*G06F 17/30* (2006.01)
*G06F 19/00* (2006.01)
(52) U.S. Cl. ......... 702/182; 702/183; 702/187; 707/758
(58) Field of Classification Search .................. 702/182, 702/183, 185, 187, 188
See application file for complete search history.

(56) References Cited

U.S. PATENT DOCUMENTS

| | | | |
|---|---|---|---|
| 5,006,992 A | 4/1991 | Skeirik | |
| 5,440,478 A | 8/1995 | Fisher et al. | |
| 5,774,372 A * | 6/1998 | Berwanger | 700/301 |
| 5,799,184 A | 8/1998 | Fulton et al. | |
| 6,094,600 A | 7/2000 | Sharpe, Jr. et al. | |
| 6,366,924 B1 | 4/2002 | Parce | |
| 6,414,788 B1 | 7/2002 | Ye et al. | |
| 6,597,973 B1 | 7/2003 | Barich et al. | |
| 6,735,541 B2 * | 5/2004 | Kern et al. | 702/84 |
| 6,748,400 B2 | 6/2004 | Quick | |
| 7,173,539 B2 | 2/2007 | Schultz | |
| 2003/0233245 A1 | 12/2003 | Zemore | |
| 2004/0024567 A1 | 2/2004 | Whaling et al. | |
| 2005/0096759 A1 | 5/2005 | Benjamin, IV et al. | |
| 2005/0149289 A1 * | 7/2005 | Whaling et al. | 702/181 |
| 2010/0185416 A1 * | 7/2010 | Furem et al. | 702/184 |

OTHER PUBLICATIONS

"DNV—DNV Pro", Nov. 9, 2004, 1 page; http://www.dnv.com/software/all/dnvPro/index.asp.
"DNV Pro brochure", Jan. 1, 2002, 2 pages.
"PHA-Pro 6"; Nov. 9, 2004; 3 pages; http://www.dyadem.com/product/pha-pro_features.htm.
"PHA-Pro 6 brochure"; Jan. 1, 2003; 2 pages.
"PHA-Pro 6 Features"; Nov. 9, 2004; 3 pages, http://www.dyadem.com/products/pha-pro/pha-pro_features.htm.

(Continued)

*Primary Examiner* — Hal Wachsman (57) ABSTRACT

An apparatus and method implementable with a software application for checking or assessing exceedances of process variables beyond safe operating limits is described. The process has instruments, a process history database, and one or more external databases. The instruments measure process variables and can be associated with the equipment. The process history database stores a plurality of values of the process variables measured by the instruments. Data of the equipment, the associated instrument, and the safe operating limit for the equipment is defined in a limit sequence of the software application. The process history database is searched for one or more exceedance values that are measured by the defined instrument and that exceed the defined safe operating limit. The "apparent" exceedance values are then imported into the software application. Finally, the user uses the software application to evaluate and validate the exceedance values.

29 Claims, 7 Drawing Sheets

OTHER PUBLICATIONS

"PHA-Pro 6 Screenshots"; Nov. 9, 2004; 2 pages; http://www.dyadem.com/products/pha-pro_screenshots.htm.

"PHA Works 4.1"; Nov. 9, 2004; 3 pages; http://www.safetyonline.com.

"Uniformance PHD"; obtained from http://www.acs.honeywell.com; generated Nov. 10, 2004; 2 pages.

"Product Information Note Uniformance PHD"; obtained from http://www..acs.honeywell.com, dated 2004; 5 pages.

"Overview of Process Guard" by Matrikon, obtained from http://www.matrikon.com, generated Nov. 10, 2004; 2 pages.

"Features of Process Guard"by Matrikon with screenshots, obtained from http://www.matrikon.com, generated Nov. 10, 2004; 20 pages.

"Process Alarms Management-Methodology"by Matrikon with screenshots, obtained from http://www.matrikon.com, generated Nov. 10, 2004; 13 pages.

"Alarm Analysis-Solutions" by Matrikon, obtained from http://www.matrikon.com, generated Nov. 10, 2004; 3 pages.

"Alarm Management Benefits" by Matrikon, obtained from http://www.matrikon.com, generated Nov. 10, 2004; 3 pages.

"Event Logger Suite Overview"; by Nikos, Inc., obtained from http://www.nikosinc.com/elogger.html, generated Nov. 10, 2004; 2 pages.

"AMO Suite" by Plant Automated Systems, obtained from http://www.pas.com/AMOSuite.htm, generated Nov. 10, 2004; 4 pages.

"AMO Plus" by Plant Automated Systems, obtained from http://www.pas.com/AMOPlus.htm, generated Nov. 10, 2004; 4 pages.

"DOC3000" by Plant Automated Sytems, obtained from http://www.pas.com/DOC3000.htm, generated Nov. 10, 2004, 7 pages.

"Integrity.MOC" by Plant Automated Systems, obtained from http://www.pas.com/IntegrityMOC.htm, generated Nov. 10, 2004, 6 pages.

"PAS Announces Automation Asset Management System" obtained from http://www.pas.com/pressrelease_imoc.htm, dated Sep. 7, 2004, 2 pages.

* cited by examiner

Related Limit Sequences Screen

| Seq: | SAP Eq No: | FL Description: | SAP Description: | Eq Name: | Inst. Tag: | SOL Type: | SOL Range: | | Limit: | FlowSheet: | Exceedances: |
|---|---|---|---|---|---|---|---|---|---|---|---|
| 1225 | 10431943 | Stripper Kettle Pro | Exchanger | 06-41-E407 | 06EI051 | SLTL | -20 | 0 | 0 | RBD_G0006_MF_42 | 0 |
| 1226 | 10431943 | Stripper Kettle Pro | Exchanger | 06-41-E407 | 06EI051 | SUTL | 200 | 500 | 200 | RBD_G0006_MF_42 | 0 |

APPARATUS AND METHOD FOR ASSESSING EXCEEDANCE OF A PROCESS BEYOND SAFE OPERATING LIMITS

CROSS-REFERENCE TO RELATED APPLICATIONS

This is a divisional application of U.S. patent application Ser. No. 10/895,212, filed Jul. 20, 2004, now abandoned, which was filed concurrently with U.S. patent application Ser. No. 10/895,169, now patented as U.S. Pat. No. 7,716,239, entitled "Apparatus and Method for Performing Process Hazard Analysis," and both applications are hereby incorporated by reference.

FIELD OF THE INVENTION

The subject matter of the present disclosure generally relates to an apparatus and method for assessing the history of a process and more particularly relates to a software application and databases implementable on a computer system for assessing measured exceedances of a process independent of the instruments and other devices used to prevent excursions.

BACKGROUND OF THE INVENTION

Figure 1:
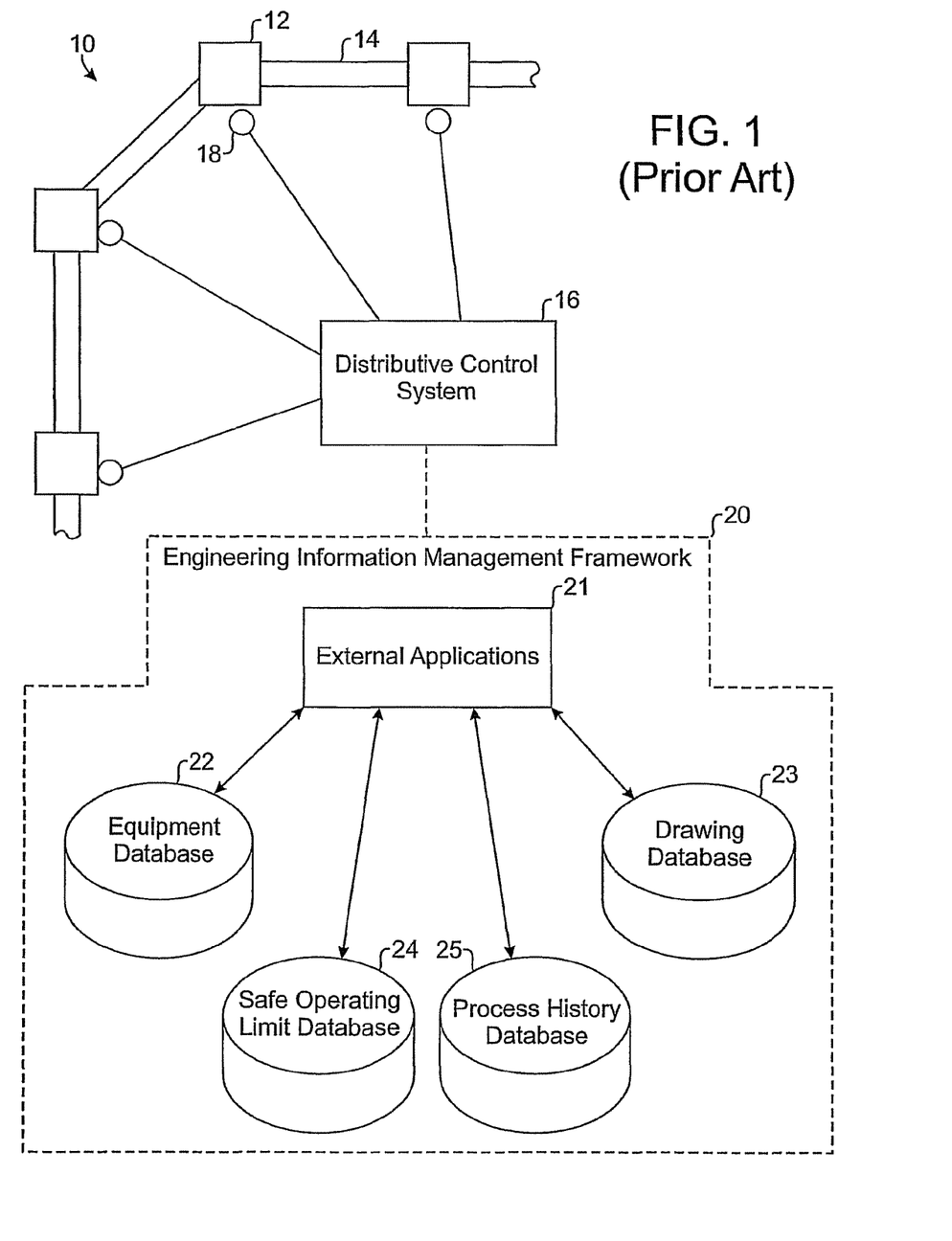
FIG. 1 schematically illustrates a process, a Distributive Control System, and an Engineering Information Management (EIM) Framework according to the prior art.

Referring to FIG. 1, a process 10 is schematically illustrated. A typical process 10 may have thousands of pieces of equipment 12, such as valves, vessels, pumps, pressure chambers, relief valves, etc., interconnected by piping 14. Each piece of equipment 12 can have several operating parameters, safeguards, overpressure scenarios, or the like. A Distributive Control System (DCS) 16 is typically used to monitor and control aspects of the process 10 automatically. The DCS 16 has a plurality of instruments 18 wired to the DCS 16. The instruments 18 are positioned along the process 10 and measure various process variables, such as pressure, temperature, flow, level, etc. The instruments 18 can be flow indicators, temperature sensors, pressure sensors, etc., which may or may not be associated with a piece of equipment 12. The DCS 16 typically uses instrument tags, which are numbers identifying particular instruments 18 in the process 10.

An Engineering Information Management (EIM) framework 20 is also typically used with the process 10. The EIM framework 20 has external applications 21 and a plurality of external databases 22-26, which store process information on a computer or network. The external applications 21 can include, but are not limited to, Lotus Notes™ (IBM®), Microsoft Access™ (Microsoft®), DOC 3000™ by Plant Automation Services Inc., and Uniformance™ Process History Database (PHD) by Honeywell, Inc. Briefly, DOC 3000™ is Windows-based software and is a data import tool for the Honeywell TPS and TDC3000™ systems. Uniformance PHD™ by Honeywell, Inc. is also based on Microsoft® technologies. Uniformance PHD™ provides data collection, data storage, historization, and visualization for process environments. The external databases 22-25 typically include an equipment database 22, a drawing database 23, a safe operating limit database 24, and a process history database 25. In the process industry, there is no standard structure for such databases, and the databases 22-25 can have a variety of different information depending on the process 10 or particular implementation.

The equipment database 22, which can be created in Lotus Notes™, stores details about equipment 12 used in the process 10. For example, the equipment database 22 typically contains equipment numbers or tags and descriptions of the equipment 12. The equipment tags can identify a specific piece of equipment 12 or can provide the functional location of the piece of equipment 12 in the process 10. The drawing database 23, which can be created in Lotus Notes™, stores details of the drawings of the process 10. For example, the drawing database 23 can contain drawing numbers of the process 10, revision dates, and descriptions or titles of the drawings.

The safe operating limit (SOL) database 24, which can be created in Lotus Notes™ or Microsoft Access™, stores details of safe operating limits for the process 10, such as the maximum or minimum pressure, temperature, levels, flow rates, compositions, etc. In the database 24, the safe operating limits are typically associated with the instrument tags of the instruments 18 used to measure the limits. In addition, the safe operating limits in the database may be associated with equipment 12 that should not exceed a specific safe operating limit.

Process standards and the Occupational Safety and Health Administration (OSHA) §1910.119(d)(2) (29 C.F.R. §1910.119) require that a process maintains safe upper and lower limits for various process variables and require that operators evaluate the effects of exceedances from such process variables. As noted previously, a safe operating limit (SOL) is a set limit for any operating variable, the exceedance of which has the potential of causing a hazardous situation in the process 10. Safe operating limits are established for all pressurized or otherwise potentially hazardous equipment 12 of the process 10. A safe operating limit can be inherent to the design of a piece of equipment 12. Also, a safe operating limit can be dictated by the process 10 and the interdependence of the process equipment 12. Examples of safe operating limits can include, but are not limited to, maximum allowable working temperature (MAWT), maximum allowable working pressure (MAWP), safe upper temperature limit (SUTL), safe lower temperature limit (SLTL), safe upper pressure limit (SUPL), safe lower pressure limit (SLPL), and the like. Other safe operating limits may also be established for operating variables as required and can include excess speed for steam turbines or minimum flow for pumps.

Software packages for recording the history of a process are known in the art.

Process history software is primarily directed to providing a log of process history conditions or values of process variables. Process history software records process variables measured from the various instruments 18 and stores the measurements in a process history database 25. The process variables are typically recorded at regular, predefined intervals (e.g., every minute) in the process history database 25. Typically, the process history database 25 holds a considerable amount of recorded data that is maintained for years. The process history database can be used to compare operation of the process during different time periods. If an incident does occur, the process history database can be used to investigate the event. The data in the process history database 25 typically includes instrument tags of the instruments 18, time entries for each measurement, and values of the process variables measured by the instruments 18. One example of process history software includes PHD™ by Honeywell, which stores data in an Oracle™ database.

To monitor and maintain the operating conditions of the process 10, the DCS 16 uses alarms, pressure relief valves, safety shutdowns, or other safeguards for the process 10. For example, alarms can be triggered when a process variable measured by an instrument 18 exceeds a predefined operating limit. When the alarm is triggered, the DCS 16 may automatically respond by opening a valve or performing some other action. Alternatively, the operators may take specific action when an alarm is triggered.

Software packages for storing the event history of the DCS 16 are also known in the art. The event history software creates a log of various DCS events, such as alarm events, triggered safeguards, alarm set point changes, alarm responses, etc. Examples of event history software includes Process Guard™ software by Matricon Pty. Ltd., Event Logger™ by Nikos, Inc., and AMO Suite™ by Plant Automated Systems. Event history software allows operators to review logs of triggered events, alarms, or other safeguards of the process 10. For example, for frequent alarms, which are often referred to as nuisance alarms, the operators can review the log and fix any setpoints if necessary.

Industry personnel may improperly assume that the number of triggered alarms or other safeguards offer a measure of the safety of the process 10. However, the process 10 typically has a large number of alarms or other safeguards, and some alarms or safeguards may be unnecessary, may be improperly set, or may be inadvertently omitted.

Thus, the number of triggered alarms or other safeguards may represent an improper estimate of the safety of the process 10. Therefore, a need exists in process industries for software that can be used to monitor a process 10 proactively and to determine whether the process 10 is legitimately operating safely with respect to actual equipment and process limits, independent of safeguards, and before an incident occurs.

The subject matter of the present disclosure is directed to overcoming, or at least reducing the effects of, one or more of the problems set forth above.

SUMMARY OF THE PRESENT DISCLOSURE

An apparatus and method implementable with a software application for checking or assessing exceedances of process variables outside of safe operating limits is disclosed. The process has instruments, a process history database, and one or more external databases. The instruments measure process variables and can be associated with the equipment. The process history database stores a plurality process variables measured by the instruments. Data of the equipment, the associated instrument, and the safe operating limit for the equipment is defined in a limit sequence of the software application. Preferably, the data of the equipment, the instrument, and the safe operating limit is imported from the one or more external databases. The process history database is searched for one or more exceedance values that are measured by the defined instrument and that exceed the defined safe operating limit. The "apparent" exceedance values are then imported from the process history database into the software application. Finally, the user uses the software application to evaluate and validate the exceedance values. For example, the software application allows the user to determine whether the correct instrument tag is assigned to the equipment or portion or the process, whether the correct safe operating limit is assigned to the instrument or process variable, or whether the exceedance is legitimate and requires further investigation or updating.

BRIEF DESCRIPTION OF THE DRAWINGS

The foregoing summary, preferred embodiments, and other aspects of subject matter of the present disclosure will be best understood with reference to a detailed description of specific embodiments, which follows, when read in conjunction with the accompanying drawings, in which.

While the disclosed exceedance checker and validation techniques are susceptible to various modifications and alternative forms, specific embodiments thereof have been shown by way of example in the drawings and are herein described in detail.

DETAILED DESCRIPTION

Figure 2:
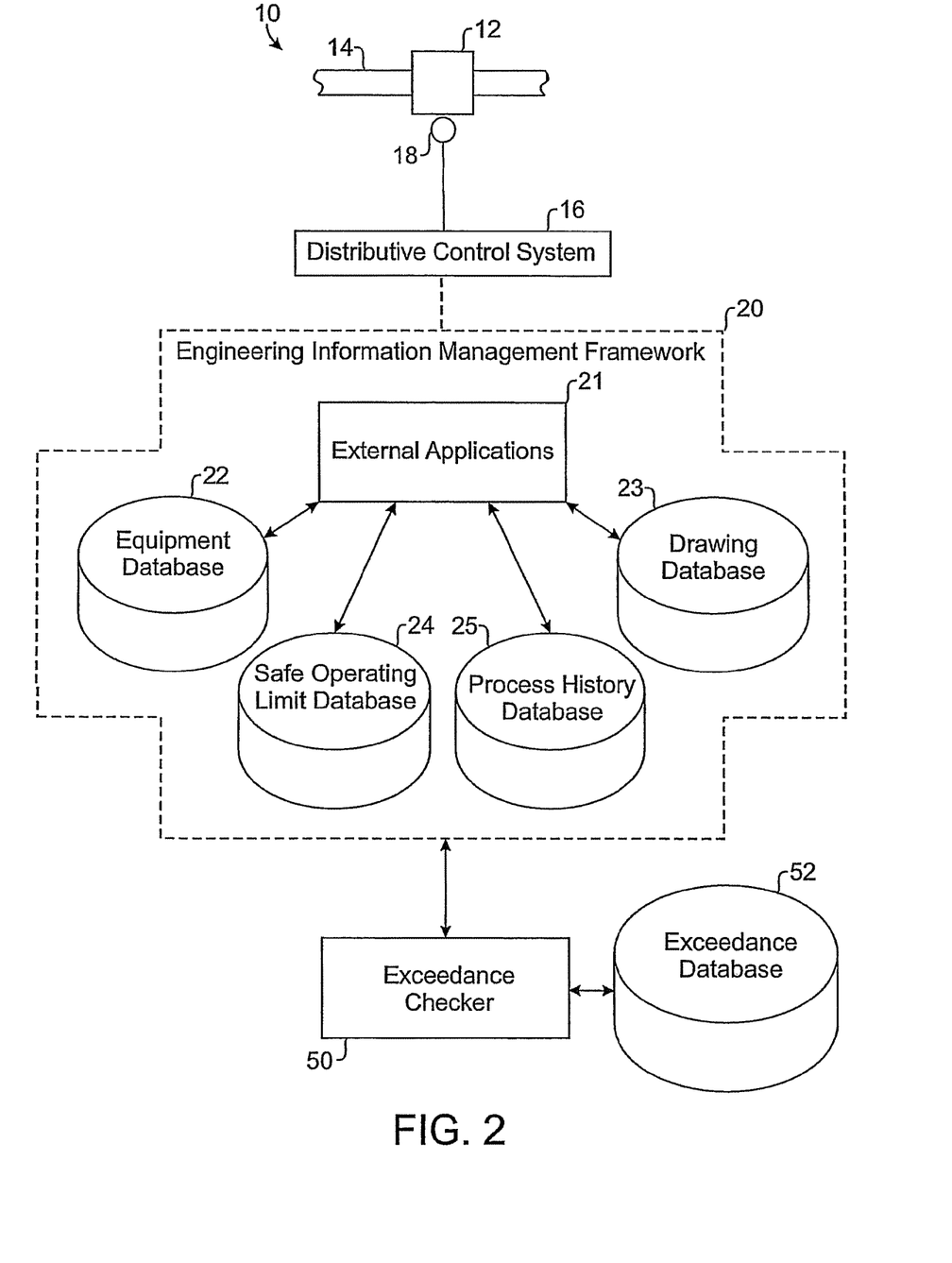
FIG. 2 schematically illustrates an embodiment of an exceedance checker according to certain teachings of the present disclosure in relation to the system of FIG. 1.

Referring to FIG. 2, an embodiment of an exceedance checker 50 according to certain teachings of the present disclosure is schematically illustrated. The exceedance checker 50 is used in relation to a process 10, a Distributive Control System (DCS) 16, and databases 22-25 of an EIM Framework 20, which are discussed above. As noted above, the DCS 16 has instruments 18, which measure operating variables of the process 10. The external databases 22-24 store data on the equipment 12, instruments 18, drawings, and safe operating limits of the process 10. Furthermore, the process history database 25 stores a history of process variables measured by the instruments 18.

The exceedance checker 50 allows a user to import data from the databases 22-25 and to store the imported data in an exceedance database 52. In one embodiment, the exceedance checker 50 is implemented in Microsoft's Visual Basic™, and the exceedance database 52 is formatted in Microsoft Access 2000™. However, it will be appreciated that the exceedance checker 50 and database 52 can be created by other techniques for creating a computer software application and database.

With the exception of the process history database 25, the other databases 22-24 are preferably relational databases where data is organized as sets of formally described tables from which data can be accessed or reassembled in many different ways without having to reorganize the database tables. By importing data from these databases 22-24, the user can readily access the data while using the exceedance checker 50. Features available in Visual Basic™, Microsoft Access™, or other programs can be used to import the data into the exceedance databases, and the interface for importing data from the relational databases 22-24 is preferably a structured query language (SQL). For example, ActiveX® Data Objects (ADO), which is a programming language for interacting with databases, can be used by the exceedance checker 50 to access data in the external databases 22-24. ADO can be used with databases created by Microsoft Access™, Lotus Notes™, DOC 3000, and Uniformance™. In addition, Lotus NotesSQL™, which is an ODBC (Open Database Connectivity) driver for Notes™ and Domino™, can read, report, and update information that is stored in Domino™ databases (".nsf" files).

In addition to importing data from databases 22-24, the exceedance checker 50 allows the user to search the process history database 25 and to import process history data into the exceedance database 52. Using the exceedance checker, the user searches the process history database 25 for measured process variables that exceed defined safe operating limits. When searching, the exceedance checker 50 preferably uses the instrument tags of the instruments 18 imported from the databases 22-24. The exceedance checker 50 can use ADO™ or Visual PHD™ to search and import data in the process history database 25. Moreover, the exceedance checker 50 can use standard trend, query, and extract tools known in the art for retrieving process history data with Visual Basic™ or Visual Basic for Applications™ using ActiveX® components.

After searching the process history database 25 and importing data on apparent exceedances, the exceedance checker 50 allows the user to assess and validate the apparent exceedances imported. For example, the apparent exceedances can be organized and validated using graphical user interfaces of the exceedance checker 50. Ultimately, the exceedance checker 50 allows the user to eliminate spurious exceedances and investigate valid exceedances.

Figure 3:
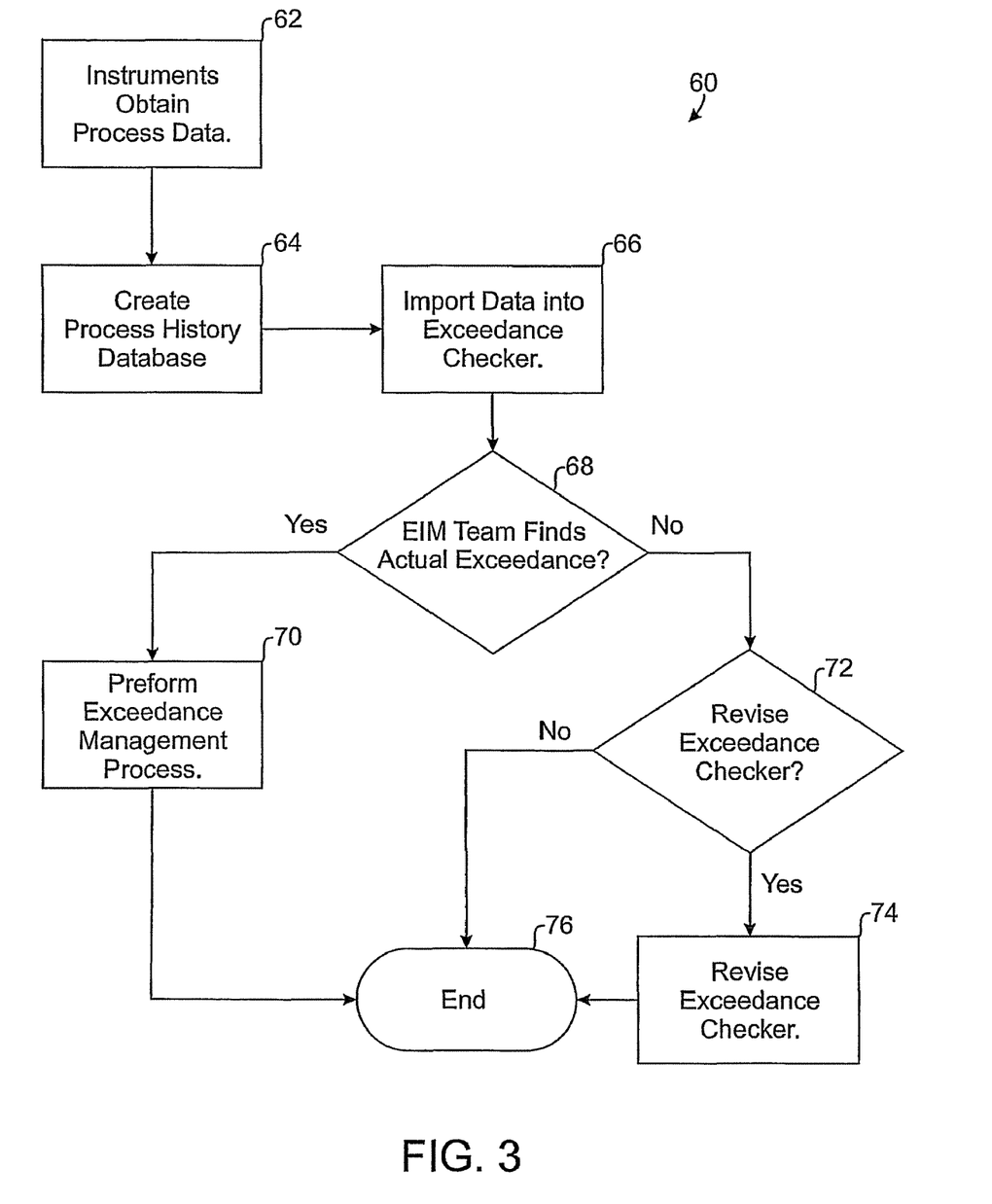
FIG. 3 illustrates a flowchart showing steps for performing an analysis of exceedances beyond safe operating limits using the disclosed exceedance checker.

Referring to FIG. 3, a flowchart 60 shows some steps for assessing and validating exceedances beyond safe operating limits using the disclosed exceedance checker. The following steps are meant to be illustrative. It is understood that not all of the steps need to be performed and that the steps need not be performed in the particular order given.

Instruments first measure process variables, such as pressure, temperature, or level, at specific points in the process (Step 62). An external application, such as Uniformance PHD™, stores the measured process variables in a process history database (Step 64). Next, the user searches the process history database with the disclosed exceedance checker and imports process variables exceeding a defined safe operating limit and measured by a particular instrument of the process (Step 66). Because the process history database (25; FIG. 2) typically contains a substantially large amount of data, the exceedance checker preferably searches for exceedances in the process history database according to an algorithm before importing data. Details of the algorithm are described in more detail with reference to FIG. 4.

Once imported, the data from the database generally corresponds to an "apparent" exceedance of the process variable. Therefore, the user determines whether the apparent exceedance is valid using the disclosed exceedance checker (Step 68). If the user determines that the apparent exceedance is valid, the user records information about the valid exceedance within the exceedance checker. Then, the user can perform standard investigative techniques to correct the process, equipment, instruments, or safe operating limits (Step 70). Standard investigative techniques may involve investigating the process to determine why the exceedance occurred, re-evaluating the equipment or instruments, resetting the safe operating limits, or performing other steps.

If the user determines that the apparent exceedance is invalid, the user records information about the invalid exceedance within the exceedance checker. Then, the user determines whether the exceedance checker needs to be revised (Step 72). The exceedance checker may need to be revised, for example, if the wrong instrument tag for measuring a safe operating limit has been improperly associated with a piece of equipment. In addition, the exceedance checker may need to be revised if the wrong safe operating limit has been assigned to a piece of equipment or instrument. If necessary, the exceedance checker allows the user to revise the instrument tag, safe operating limit, process variable, etc. (Step 74). For example, the user can change parameters, values, or filters defined in the exceedance checker and then search the process history database again for exceedances. Monitoring the safe operating performance with the exceedance checker can then be ended once actual exceedances have been investigated, illegitimate exceedances have been invalidated, or the exceedance checker has been revised (Step 76).

FIGS. 4 through 7 illustrate an embodiment of an exceedance checker according to certain teachings of the present disclosure. The disclosed exceedance checker is implemented as a software application having a graphical user interface (GUI). Accordingly, the exceedance checker includes a plurality of GUI screens 100, 108, 160, and 200, which allow a user to perform various tasks. In general, the tasks include defining data on the equipment, the instruments, and the safe operating limits of the process; searching and importing data in the various databases (22-25, FIG. 2); and validating apparent exceedances obtained from the process history database (25, FIG. 2). The screens 100, 108, 160, and 200 described below with reference to FIGS. 4 through 7 have some of common features of graphical user interfaces, such as menu bars, record navigation buttons, and scroll bars. These and other common features of a graphical user interface are not described in the following screens and may simply be omitted from the FIGS. 4 through 7 for clarity.

Figure 4:
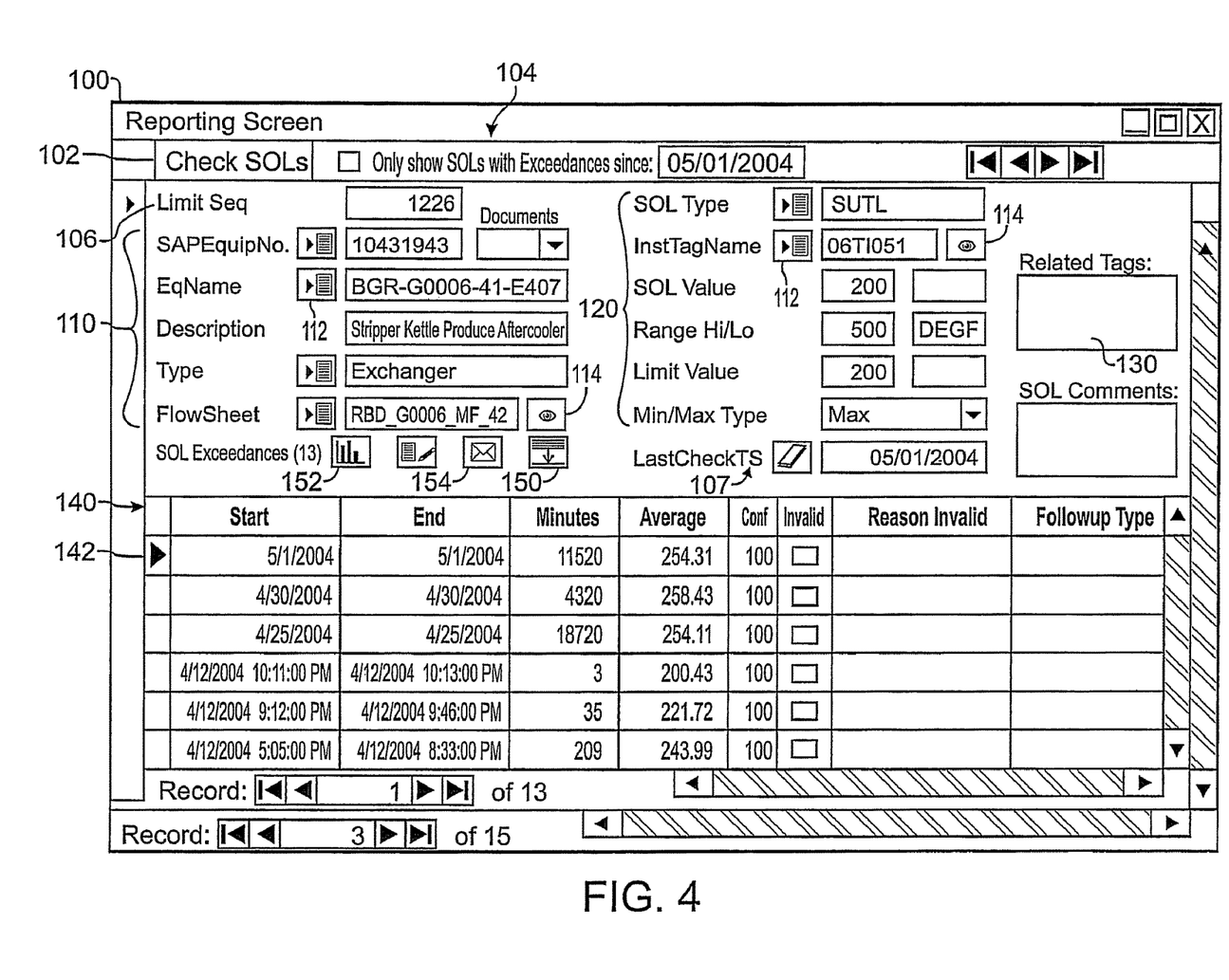
FIG. 4 illustrates an embodiment of a reporting screen of the disclosed exceedance checker.

Referring to FIG. 4, a reporting screen 100 of the exceedance checker allows the user to obtain and input data on apparent exceedances from the process history database. Only one limit sequence is displayed on the screen 100. The limit sequence corresponds to a session for obtaining exceedances of a process variable for a given time period. Each limit sequence is given a number, as shown in the LimitSeq field 106, and a time stamp field 107 ("LastCheck TS") for indicating the date of the last exceedance check. This number enables the user to organize the various limit sequences performed on the process.

Defining Equipment, Safe Operating Limits, and Instruments is described as follows.

Before obtaining exceedances from the process history database, the user defines equipment of the process to be assessed, the instrument for measuring the process variable, and the safe operating limit for the process variable. To that end, the reporting screen 100 includes equipment fields 110 and safe operating limit fields 120. The equipment fields 110 define information on the equipment, such as SAP equipment number, related documents, name, description, type, and flowsheet. The SOL fields 120 define information on the instrument and the safe operating limit, such as type of SOL, instrument tag name, value for SOL, high/low range, exceedance limit value, and maximum or minimum measured values. The exceedance limit value ("Limit") is typically a more conservative value between the "SOL Type" and the "Range Hi/Lo." Preferably, the fields 110 and 120 are populated from data imported into the exceedance checker from external databases (22-24; FIG. 2), but the screen 100 may also allow free text entry of information in these fields 110 and 120.

Figure 5:
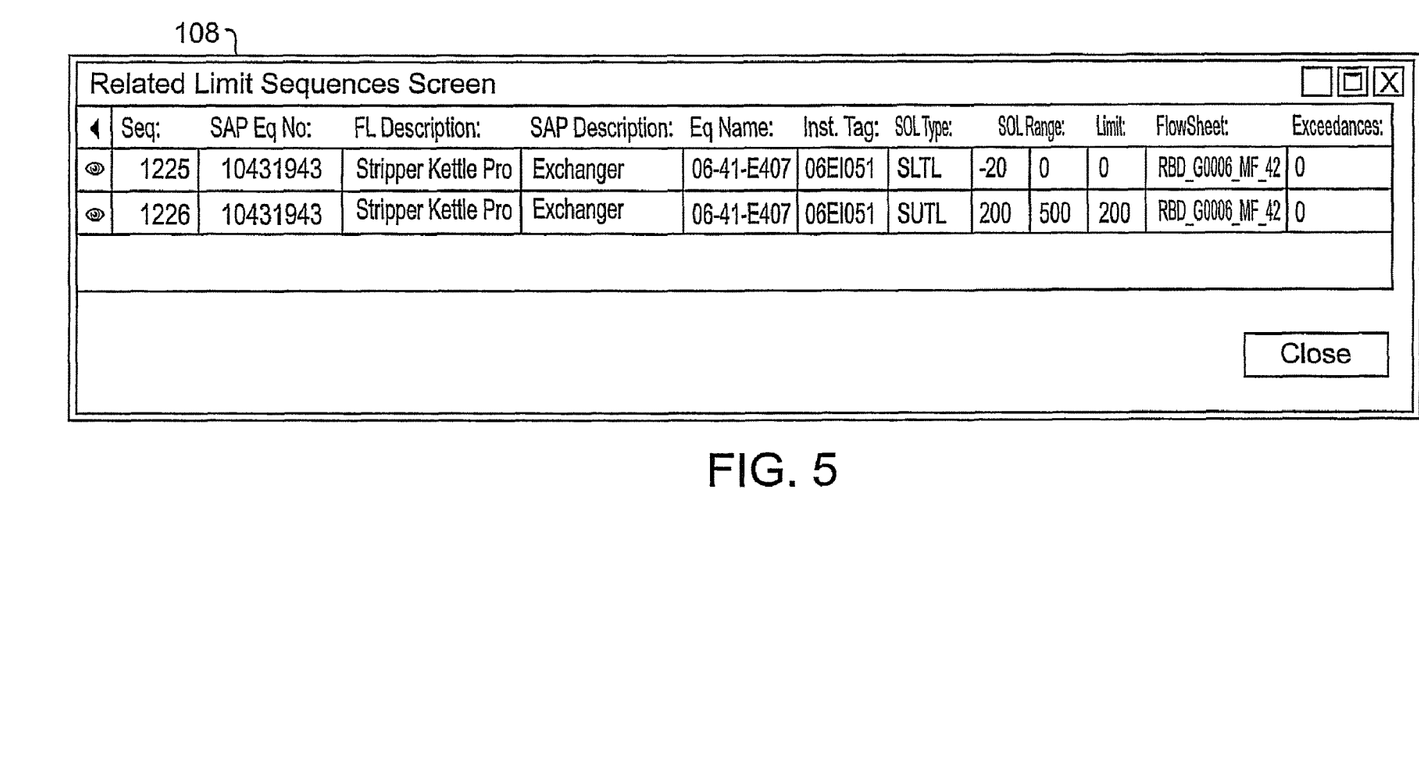
FIG. 5 illustrates a screen listing limit sequences having the same equipment.
Figure 6:
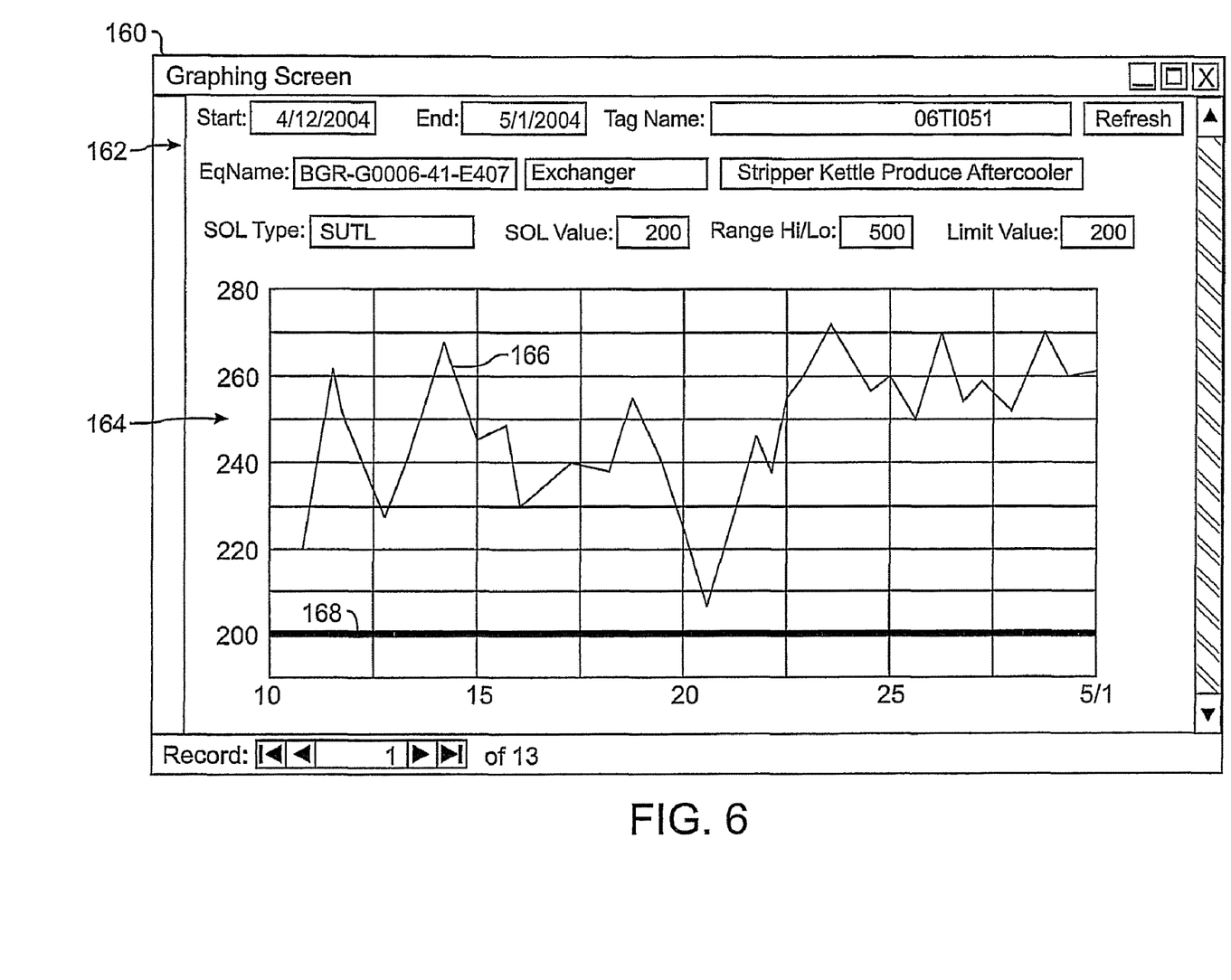
FIG. 6 illustrates an embodiment of a graphing screen of the disclosed exceedance checker.

In addition to fields 110 and 120 for defining information, the reporting screen 100 allows the user to review related limit sequences having similar information. For example, a text field 130 allows the user to enter other tags of other instruments related to the instrument of the present limit sequence. Furthermore, buttons 112 allow the user to view other limit sequences having the same entry within the given field 110 or 120 next to the button 112. (FIG. 5 shows a screen 108 displaying limit sequences stored in the exceedance checker database that have the same piece of equipment number.) Moreover, buttons 114 allow the user to view drawings defined in some of the fields 110 and 120. To access and view the drawings, the exceedance checker preferably uses Volo-View™ by AutoDesk, which is a program for viewing CAD drawings.

Searching the Process History Database for Exceedances and Importing Apparent Exceedances is described as follows.

Once information on the equipment, safe operating limit, and instrument tag has been defined in fields 110 and 120, an action button 102 ("Check SOLs") allows the user to search data in the process history database (25, FIG. 2) and import apparent exceedances. In particular, the exceedance checker searches the process history database for exceedances measured by the defined instrument tag ("InstTagName") beyond the defined safe operating limit or instrument limit ("Limit Value"). Field 104 ("Only Show SOLs with Exceedances since [DATE]") allows the user to limit the search of the process history database beyond a specified date. After finding "apparent" exceedances, the exceedance checker imports the data from the process history database (25, FIG. 2) and displays the "apparent" exceedances as exceedance records 142 in a table 140.

Because the process history database typically contains a substantial amount of data, the exceedance checker preferably uses an algorithm to search the process history database for exceedances. Beyond the date defined in field 104 (if any), the exceedance checker searches for values that are measured by the defined instrument tag and that exceed the defined SOL limit. When an interval of exceedance values is encountered, the exceedance checker preferably calculates an average value over a duration of the apparent exceedance. Ultimately, the exceedance checker displays the start, end, duration, and average exceedance value in columns of the table 140. Although the average values of the exceedances are calculated and displayed on the screen 100, discrete values of the apparent exceedances are preferably stored in the exceedance database (52, FIG. 2) for merging records 142, graphing the exceedances, and other purposes described herein.

The duration of some of apparent exceedances in the records 142 may be very long, indicating a potentially sustained problem. On the other hand, the duration of some apparent exceedances in the records 142 may be relatively short and may be as short as the time interval for making measurements. Very short durations may be the result of hysteresis in the process, an improperly defined safe operating limit, a damaged instrument, or other issue. Due to these issues, a large number of exceedance records 142 may be repeatedly reported in short succession to one another in the table 140. Therefore, the exceedance checker can ignore or combine such short, repeated apparent exceedances when searching the process history database.

In one embodiment when performing the searching algorithm, the exceedance checker can automatically merge or combine adjacent exceedances found in the process history database that are only separated by a predefined interval. For example, if the checker locates a first exceedance spanning two hours and locates a second exceedance spanning thirty minutes but only separated from the first exceedance by two minutes, the exceedance checker can combine the two time spans and average all of the measured values to produce a "single" exceedance record 142 for the table 140. In addition, for example, if the checker locates fifteen separate exceedances spanning several minutes apiece but only separated from each other by one minute, the exceedance checker can combine the time spans and average all of the measured values to produce a "single" exceedance record 142 for the table 140. In addition to automatically merging adjacent exceedances, the user can manually merge records 142 by selecting adjacent records 142 and using a merge button 150. In addition to merging records, a record 142 can be separated or unmerged into separate records using the exceedance checker. For example, a record 142 (having data values in a given interval) can be automatically or manually separated or unmerged into a plurality of separate records 142 (having separate portions of the data values in separate portions of the given interval).

After importing the apparent exceedances, the user can view a graph of the measured values. Graph button 152 pulls up a graphing screen 160 shown in FIG. 6. The graphing screen 160 shows information 162 populated from the selected exceedance record (142; FIG. 4). In addition, a graph 164 shows the measured values 166 for the apparent exceedance in conjunction with the defined SOL limit 168. The exceedance checker preferably uses Visual PHD™ to produce the graph 164.

Figure 7:
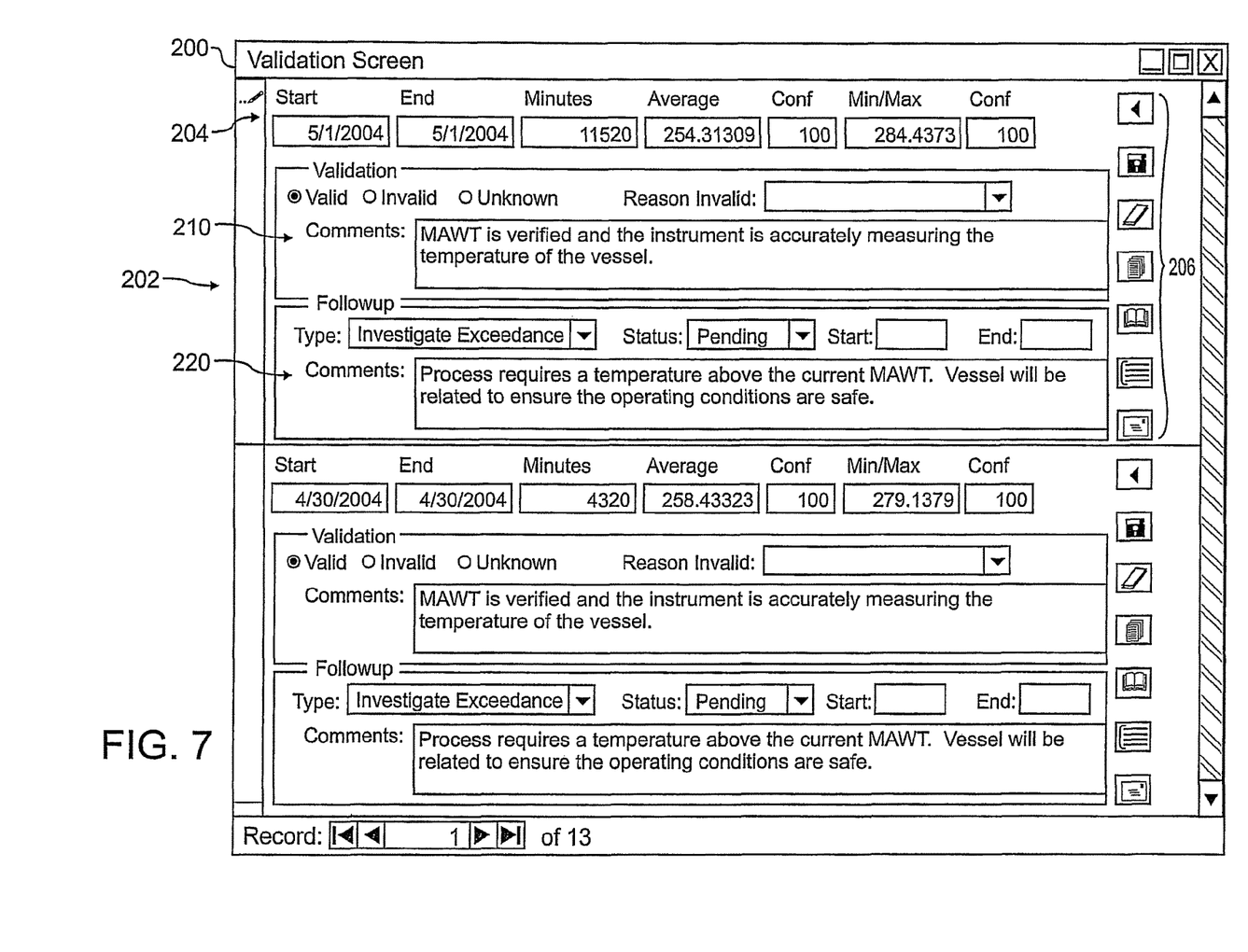
FIG. 7 illustrates an embodiment of a validation screen of the disclosed exceedance checker.

Once apparent exceedances are imported from the process history database, the exceedance checker includes tools for the user to assess and validate the apparent exceedances. For example, the table (140; FIG. 4) in the present embodiment includes columns for marking the apparent exceedance as invalid, for showing the reasons the user has determined the exceedance record as being invalid, and for showing any follow-up action required to investigate a valid exceedance. A comment button 154 pulls up a validation screen shown in FIG. 7 for entering information for these columns. In FIG. 7, the validation screen 200 includes complementary records 202 for each of the exceedance records (142; FIG. 4). The records 202 each include validation fields 210, follow-up fields 220, and standard editing buttons 206.

The validation fields 210 allow the user to enter comments on the record 202 and to mark the record 202 as "Valid," "Invalid," or "Unknown." For invalid exceedance records 202, predetermined reasons can be chosen to indicate why the exceedance is actually invalid. In one embodiment, the predetermined reasons can include "Incorrect Limit-Instrument Range," "Incorrect Limit-SOL," Incorrect Reading," and "Wrong Instrument Tag." When analyzing the history of a process, the user may use these and other predefined reasons for invalidating an apparent exceedance measured from the process.

By way of example, the exceedance may be invalid because the safe operating limit has been defined in the exceedance checker largely outside the instrument's range. Thus, the exceedance record is based on an erroneous instrument range, and the user may infer that an actual safe operating limit was never reached. By way of another example, the safe operating limit for a process variable may be incorrectly set. Alternatively, the instrument reading may be incorrect because the instrument measures a different process variable than required by the safe operating limit. The defined instrument tag may be wrong, for example, because the instrument tag defined in the exceedance checker does not actually measure the operating condition of the process or designated piece of equipment.

The follow-up fields 220 allow the user to enter comments for follow-up on a valid record 202 by providing predefined options, such as a follow-up type dropdown, a status dropdown, and start and end fields. These fields 220 allow the user to track any follow-up investigations required on invalid and legitimate exceedances. In one embodiment, the predefined follow-up options in the dropdown can include "Investigate Exceedance," "Check Instrument Name Tag," "Check Instrument Range," "Reconfigure and Reprocess," and "Maintain Instrument." When analyzing the process hazard history of a process, the user may use these and other predefined follow-up options for investigating invalid and legitimate exceedances.

By way of example, investigating the exceedance can be selected when the exceedance appears valid and the user must investigate why the exceedance occurred. Checking the instrument tag can be selected when the assigned instrument tag does not appear to correspond with the piece of equipment to which it is associated. Checking the instrument range can be selected when the instrument range is frequently exceeded and further investigation is required. Reconfiguring and reprocessing can be selected when the exceedance appears invalid and the user must correct the safe operating limit and recheck for exceedances. Finally, maintaining the instrument can be selected when the instrument reading appears incorrect and the instrument needs replacement.

The exceedance checker allows a user to import data from existing databases of an EIM Framework, search a process history database for apparent exceedances, import the apparent exceedances from the process history database, display and organize the apparent exceedances, and validate and comment on the apparent exceedances. After validating exceedances and entering comments and any follow-up options for the exceedances, the user can disregard invalid exceedances, investigate why an exceedance is invalid, investigate causes of valid exceedances, and revise the exceedance checker as necessary.

The foregoing amply illustrates to a computer programmer of skill how to make and use the disclosed exceedance checker and its accompanying user interfaces and other functional aspects. Therefore, programming such accompanying user interfaces and other functional aspects would be a routine matter to a computer programmer of skill and can be accomplished with many different programming languages and within the context of many different operating systems. Of course, the exceedance checker disclosed herein would be ultimately coded into a computer code and stored on a computer-readable media, such as a compact disk, a tape, stored in a volatile or non-volatile memory, etc.

The foregoing description of preferred and other embodiments is not intended to limit or restrict the scope or applicability of the inventive concepts conceived of by the Applicant.

What is claimed is:

1. A method implementable on a computer system for assessing exceedance of safe operating limits of a process, the process having equipment and having an instrument for measuring a process variable of said equipment, the computer system having access to equipment data for the process, instrument data for the equipment, and a process history database storing the process variable measured by the instrument, the method comprising:
   (a) electronically importing equipment data for the process and instrument data for the equipment into a database for exceedance monitoring, wherein the instrument data comprises safe operating limits of the process;
   (b) for a selected piece of equipment in the process having an associated instrument for measuring the process variable, completing a reporting record with information from the exceedance monitoring database, wherein the reporting record includes a defined instrument tag and defined limits including an exceedance limit value associated with safe operating limits for the process;
   (c) electronically searching the process history database, based on the defined instrument tag and defined limits in the reporting record, for data values of the process variable measured by the instrument which exceed the exceedance limit value;
   (d) electronically importing the data values from the process history database into the exceedance monitoring database as discrete exceedance values representing apparent exceedances;
   (e) displaying as part of the reporting record one or more exceedance records each representing apparent exceedances for an interval of time representing the duration of the apparent exceedance for evaluation by a user; and
   (f) electronically recording based on input from the user whether the apparent exceedance is valid or invalid.

2. The method of claim 1 further comprising, if the apparent exceedance is invalid, receiving user input to revise the defined instrument tag and/or defined limits in the reporting record that led to the invalid apparent exceedance.

3. The method of claim 2 wherein the information in the reporting record information to be revised includes one or more of correcting a wrong instrument tag and correcting a wrong safe operating limit.

4. The method of claim 2, further comprising repeating steps (c) through (f) with the defined instrument tag and defined limits in the revised reporting record resulting in one or more new exceedance records that exclude the invalid apparent exceedances.

5. The method of claim 2 further comprising receiving user input regarding the invalid apparent exceedance selected from a list comprising incorrect limit-instrument range, incorrect limit-SOL, incorrect reading, and wrong instrument tag.

6. The method of claim 1 further comprising, if the apparent exceedance is valid, receiving user input to record the type of followup recommended.

7. The method of claim 6, further comprising, after the followup is accomplished, repeating steps (c) through (f) resulting in one or more new exceedance records.

8. The method of claim 6, further comprising receiving user input regarding followup for the valid apparent exceedance selected from the list comprising investigate exceedance, check instrument name tag, check instrument range, reconfigure and reprocess, and maintain instrument.

9. The method of claim 1 wherein the instrument data for the equipment comprises one or more of type of safe operating limit, instrument tag name, value for safe operating limit, high/low range, exceedance limit value, and maximum or minimum measured values.

10. The method of claim 9 wherein the exceedance limit value is a value between the value for safe operating limit and the high/low range for type of safe operating limit.

11. The method of claim 1 wherein the equipment data comprises one or more of equipment number, equipment related documents, name, description, type, and flowsheet.

12. The method of claim 1 further comprising limiting the search of the process history database according to a defined time.

13. The method of claim 1 wherein the exceedance record represents an average of the discrete exceedance values for the interval of time.

14. The method of claim 13 wherein the exceedance record represents a start of the interval, an end of the interval, a duration of the interval, and the average of the discrete exceedance values during the interval.

15. The method of claim 1 further comprising electronically merging into a single exceedance record adjacent exceedance records that are separated by a predefined interval.

16. The method of claim 15 wherein the merging is accomplished automatically prior to displaying the exceedance records.

17. The method of claim 15 wherein the merging is accomplished manually by receiving a selection of adjacent records from the user.

18. The method of claim 15 further comprising electronically unmerging a single exceedance record back into separate adjacent exceedance records.

19. The method of claim 1 further comprising rendering a graph of the discrete exceedance values displayed in conjunction with the safe operating limit for a selected exceedance record.

20. A method implementable on a computer system for assessing exceedance of safe operating limits of a process, the process having equipment and having an instrument for measuring a process variable, the computer system having access to a process history database storing the process variable measured by the instrument, the method comprising:
   (a) receiving data to complete fields in a reporting record comprising, for a selected piece of equipment, equipment data for the process and instrument data for the equipment, wherein the instrument data comprises a defined instrument tag and defined limits including safe operating limits of the process and an exceedance limit value associated with safe operating limits for the process;
   (b) using the defined instrument tag and defined limits in the reporting record to electronically search the process history database for data values of the process variable measured by the instrument which exceed the exceedance limit value;
   (c) electronically importing the data values from the process history database into an exceedance monitoring database as discrete exceedance values representing apparent exceedances;
   (d) displaying one or more exceedance records each representing apparent exceedances for an interval of time representing the duration of the apparent exceedance for evaluation by a user; and
   (e) electronically recording based on input from the user whether the apparent exceedance is valid or invalid.

21. The method of claim 20 further comprising, if the apparent exceedance is invalid, receiving user input to revise the defined instrument tag and/or defined limits in the reporting record that led to the invalid apparent exceedance.

22. The method of claim 21, further comprising repeating steps (b) through (e) with the defined instrument tag and defined limits in the revised reporting record resulting in one or more new exceedance records that exclude the invalid apparent exceedances.

23. The method of claim 20 further comprising, if the apparent exceedance is valid, receiving user input to record the type of followup recommended.

24. The method of claim 23, further comprising, after the followup is accomplished, repeating steps (b) through (e) resulting in one or more new exceedance records.

25. The method of claim 20 wherein the exceedance record represents an average of the discrete exceedance values for the interval of time.

26. The method of claim 20 further comprising electronically merging into a single exceedance record adjacent exceedance records that are separated by a predefined interval.

27. The method of claim 26 further comprising electronically unmerging a single exceedance record back into separate adjacent exceedance records.

28. A non-transitory computer-readable medium having instructions to perform a method implementable on a computer system for assessing exceedance of safe operating limits of a process, the process having equipment and having an instrument for measuring a process variable, the computer system having access to a process history database storing the process variable measured by the instrument, the instructions when executed by the computer perform the steps of:
   (a) electronically importing equipment data for the process and instrument data for the equipment into a database for exceedance monitoring, wherein the instrument data comprises safe operating limits of the process;
   (b) for a selected piece of equipment in the process having an associated instrument for measuring a process variable, completing a reporting record with information from the exceedance monitoring database, wherein the reporting record includes a defined instrument tag and defined limits including an exceedance limit value associated with the safe operating limits for the process;
   (c) electronically searching the process history database, based on the defined instrument tag and defined limits in the reporting record, for data values of the process variable measured by the instrument which exceed the exceedance limit value;
   (d) electronically importing the data values from the process history database into the exceedance monitoring database as discrete exceedance values representing apparent exceedances;
   (e) displaying as part of the reporting record one or more exceedance records each representing apparent exceedances for an interval of time representing the duration of the apparent exceedance for evaluation by a user; and
   (f) electronically recording based on input from the user whether the apparent exceedance is valid or invalid, wherein if the apparent exceedance is invalid, receiving user input to revise the defined instrument tag and/or defined limits in the reporting record that led to the invalid apparent exceedance and selectively repeating steps (c) through (f) with defined instrument tag and defined limits in the revised reporting record resulting in one or more new exceedance records that exclude the invalid apparent exceedances.

29. A non-transitory computer-readable medium having instructions to perform a method implementable on a computer system for assessing exceedance of safe operating limits of a process, the process having equipment and having an instrument for measuring a process variable, the computer system having access to a process history database storing the process variable measured by the instrument, the instructions when executed by the computer perform the steps of:
   (a) receiving data to complete fields in a reporting record comprising, for a selected piece of equipment, equipment data for the process and instrument data for the equipment, wherein the instrument data comprises a defined instrument tag and defined limits including safe operating limits of the process and an exceedance limit value associated with safe operating limits for the process;
   (b) using the defined instrument tag and defined limits in the reporting record to electronically search the process history database for data values of the process variable measured by the instrument which exceed the exceedance limit value;
   (c) electronically importing the data values from the process history database into an exceedance monitoring database as discrete exceedance values representing apparent exceedances;

(d) displaying one or more exceedance records each representing apparent exceedances for an interval of time representing the duration of the apparent exceedance for evaluation by a user; and (e) electronically recording based on input from the user whether the apparent exceedance is valid or invalid, wherein if the apparent exceedance is invalid, receiving user input to revise the defined instrument tag and/or defined limits in the reporting record that led to the invalid apparent exceedance and selectively repeating steps (b) through (e) with the defined instrument tag and defined limits in the revised reporting record resulting in one or more new exceedance records that exclude the invalid apparent exceedances.

* * * * *